(12) United States Patent
Weldemariam et al.

(10) Patent No.: US 10,572,121 B2
(45) Date of Patent: Feb. 25, 2020

(54) CONTEXTUAL USER PROFILE PHOTO SELECTION

(71) Applicant: International Business Machines Corporation, Armonk, NY (US)

(72) Inventors: Komminist Weldemariam, Nairobi (KE); Shikhar Kwatra, Morrisville, NC (US); Sarbajit K. Rakshit, Kolkata (IN); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/893,019

(22) Filed: Feb. 9, 2018

(65) Prior Publication Data

US 2019/0250795 A1    Aug. 15, 2019

(51) Int. Cl.
| | | |
|---|---|---|
| *G06F 3/0484* | (2013.01) | |
| *G06F 3/0483* | (2013.01) | |
| *H04L 29/08* | (2006.01) | |
| *G06F 16/54* | (2019.01) | |

(52) U.S. Cl.
CPC ........ *G06F 3/04842* (2013.01); *G06F 3/0483* (2013.01); *G06F 16/54* (2019.01); *H04L 67/306* (2013.01)

(58) Field of Classification Search
CPC .... G06F 3/04842; G06F 16/54; G06F 3/0483; H04L 67/306
See application file for complete search history.

(56) References Cited

U.S. PATENT DOCUMENTS

| | | |
|---|---|---|
| 8,738,553 B1 | 5/2014 | Leung et al. |
| 8,867,849 B1 | 10/2014 | Kirkham et al. |
| 9,158,857 B2 | 10/2015 | Preetham et al. |
| 9,275,420 B1 | 3/2016 | Fredinburg et al. |
| 2009/0031003 A1 | 1/2009 | Velarde |
| 2009/0327923 A1 | 12/2009 | Walker et al. |

(Continued)

FOREIGN PATENT DOCUMENTS

WO    2016040922 A1    3/2016

OTHER PUBLICATIONS

Mahmud, J., "IBM Watson Personality Insights: The science behind the service", Published on Mar. 23, 2015 / Updated on Apr. 9, 2015, 9 pages, https://developer.ibm.com/watson/blog/2015/03/23/ibm-watson-personality-insights-science-behind-service/.

(Continued)

*Primary Examiner* — Andrea N Long
(74) *Attorney, Agent, or Firm* — Scully, Scott, Murphy & Presser, P.C.; Eyal Gilboa

(57) ABSTRACT

Selecting and displaying a profile photo may include determining viewer characteristics of a viewer who is triggering an action to open an image file that shows a photo image. A context associated with viewing of the profile photo and photo image characteristics of a plurality of photos may be determined. Based on the viewer characteristics, the photo image characteristics and the context associated with viewing of the profile photo, a photo from the plurality of photos may be selected. Responsive to determining that the selected photo is to be transformed, a transformed version of the photo image may be generated and displayed.

20 Claims, 4 Drawing Sheets

(56) References Cited

U.S. PATENT DOCUMENTS

| | | | |
|---|---|---|---|
| 2012/0188405 A1* | 7/2012 | Morrison | G06F 16/58 348/231.2 |
| 2013/0139241 A1* | 5/2013 | Leeder | H04W 12/06 726/9 |
| 2013/0205408 A1* | 8/2013 | Yerli | H04L 63/10 726/28 |
| 2013/0282808 A1* | 10/2013 | Sadanandan | G06Q 10/10 709/204 |
| 2014/0033044 A1* | 1/2014 | Goldman | G06Q 30/02 715/727 |
| 2014/0040775 A1 | 2/2014 | Stoop et al. | |
| 2014/0047369 A1 | 2/2014 | Schiller | |
| 2014/0074620 A1 | 3/2014 | Bosworth et al. | |
| 2014/0156762 A1* | 6/2014 | Yuen | H04L 51/32 709/206 |
| 2014/0157153 A1* | 6/2014 | Yuen | A63F 13/537 715/758 |
| 2014/0188991 A1* | 7/2014 | Dhara | H04L 67/306 709/204 |
| 2015/0012822 A1 | 1/2015 | Dijulio et al. | |
| 2016/0066047 A1 | 3/2016 | Sirpal et al. | |
| 2016/0156953 A1 | 6/2016 | Phipps et al. | |
| 2017/0346772 A1* | 11/2017 | Albouyeh | H04L 51/10 |
| 2018/0060439 A1* | 3/2018 | Kula | H04L 51/32 |
| 2018/0095606 A1* | 4/2018 | Chae | H04L 51/32 |
| 2018/0213056 A1* | 7/2018 | Chau | H04L 67/306 |

OTHER PUBLICATIONS

Kelley, M., "IBM Researcher Can Build A Detailed Personality Profile Of You Based On 200 Tweets", Oct. 11, 2013, 5 pages, https://www.businessinsider.in/IBM-Researcher-Can-Build-A-Detailed-Personality-Profile-Of-You-Based-On-200-Tweets/articleshow/23989736.cms.

Fitzmacken, T., "Tracking Visitor Information (Analytics) for an ASP.NET Web Pages (Razor) Site", Feb. 17, 2014, 5 pages, https://docs.microsoft.com/en-us/aspnet/web-pages/overview/performance-and-traffic/14-analyzing-traffic.

* cited by examiner

CONTEXTUAL USER PROFILE PHOTO SELECTION

FIELD

The present application relates generally to computers and computer applications, and more particularly to selecting and morphing images to display based on criteria.

BACKGROUND

User photos can be displayed as an image via many different computer applications on a computer display device. For instance, a web browser displaying a social media web site page can display a user's photo in different contexts. Web sites such as a company's directory site or a professional site may display a user photo in a professional setting. Individuals have various photos expressing various personas and/or moods, and the expressions may change depending on who the viewer is, what impression the user would like to convey to the viewer and so on.

BRIEF SUMMARY

A method and system of selecting and displaying a profile photo may be provided. The method, in one aspect, may include determining viewer characteristics of a viewer who is triggering an action to open an image file comprising a photo image of a user, a group of users, or an object, to view a profile photo of the user, a group of users, and/or an object, the determining performed based on analyzing at least social media application data. The method may also include determining a context associated with viewing of the profile photo. The method may further include determining photo image characteristics of a plurality of photos stored on at least one storage device. The method may also include, based on the viewer characteristics, the photo image characteristics and the context associated with viewing of the profile photo, selecting a photo from the plurality of photos. The method may further include determining whether the selected photo is to be transformed. The method may also include, responsive to determining that the selected photo is to be transformed, generating a transformed version of the photo image of the user, the group of users, and/or the object, and displaying the transformed version of the photo image of the user, the group of users, and/or the object, on a display device associated with the viewer via a user interface. The method may further include, responsive to determining that the selected photo need not be transformed, displaying the selected photo on the display device via the user interface.

A system of selecting and displaying a profile photo, in one aspect, may include a hardware processor coupled with a communications network and at least one storage device coupled with the hardware processor. The hardware processor operable to perform determining viewer characteristics of a viewer who is triggering an action to open an image file comprising a photo image of a user, the group of users, and/or the object, to view a profile photo of the user, the group of users, and/or the object, the determining performed based on analyzing at least social media application data. The hardware processor may be further operable to determine a context associated with viewing of the profile photo. The hardware processor may be further operable to determine photo image characteristics of a plurality of photos stored on the at least one storage device. The hardware processor may be further operable to, based on the viewer characteristics, the photo image characteristics and the context associated with viewing of the profile photo, select a photo from the plurality of photos. The hardware processor may be further operable to determine whether the selected photo is to be transformed. The hardware processor may be further operable to, responsive to determining that the selected photo is to be transformed, generate a transformed version of the photo image of the user, the group of users, and/or the object, and trigger a displaying of the transformed version of the photo image of the user, the group of users, and/or the object, on a display device associated with the viewer via a user interface. The hardware processor may be further operable to, responsive to determining that the selected photo need not be transformed, trigger a displaying of the selected photo on the display device via the user interface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
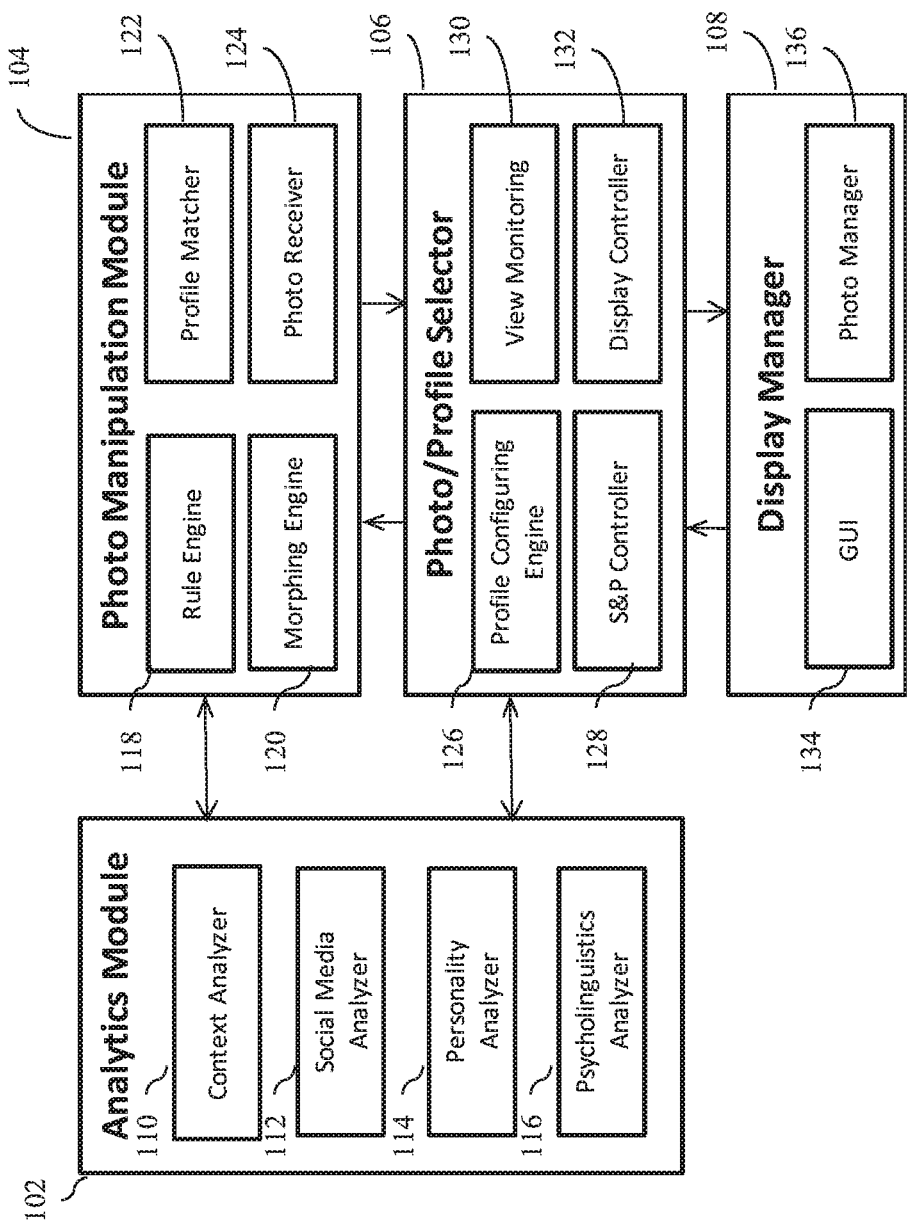
FIG. 1 is a block diagram illustrating components of a system of selecting and displaying photos in one embodiment.

Method, system and techniques are provided, which display a profile photograph (e.g., on a World Wide Web's web page) and automatically select one or more photographs to display based on an analysis of a viewer of the photographs and characteristics of available user photos and/or analysis of various context (e.g., user context and geo-location context).

A person usually has photographs (also referred to as photos) of that person which present various different personas and context (e.g., expressions, sympathy, condolences). Different photos may be presented to different viewers depending on various criteria. For example, on social media's web pages, photographs are often used. Photos or even playful drawings of users are used on various computer displays such as web pages, and even at web sites such as resume sites and business sites, for example, for purposes.

In some embodiments, the web page with the photo may be a social media web page or a company's directly web page, a job site's web page, and/or others. The viewer analysis performed by the system and/or method of the present disclosure in some embodiments may include an estimation of viewer demographic; geographic location (e.g., culturally sensitive place) and context of the viewer (e.g., expression, sympathy, condolences); service provider of the viewer; interests of viewer, role of the viewer (e.g., friend, a manager at a company, a job recruiter or a bot recruiter); the number of page views for individual pages, which indicates approximately how many people are visiting the site displaying the photo and which pages on the site are the most popular; duration of time people spend on specific pages, which indicates information such as whether a home page is keeping people's interests, what sites people were visiting before they visited the site, which help in understanding whether the web traffic is coming from links on other web pages, from searches, and/or others; when (e.g., the time) people visit the site and how long they stay; what countries the site visitors are from, for example, to determine types of dress code (e.g., liberalness, conservativeness), what browsers and operating systems the visitors are using; and/or others.

Characteristics of photos may involve any one or more of: facial expression and mood, cropping, magnification, size, clothing, color themes, hair style, lighting, position, posture, viewpoint, background image, attractiveness estimation based on crowdsourcing (e.g., voting), the person photographed alone or with others (e.g., spouse or another), photorealism (e.g., a real photo, an avatar, a drawing or sketch), and/or animation.

Additional context may include time and place a viewer is opening a profile and photo, e.g., in a public place such as culturally sensitive place, a place where hijab is required, and/or others, time of day, holiday, and/or day of week.

Information on the viewer (e.g., of the photo on a Web page, social media app) may be performed in an opt-in fashion and/or may be gleaned from a social media profile such as those shown on a social media application's web page or wall posting. The photos may be pre-loaded by a user. For instance, a user may provide the system with a number of photos (e.g., 5 photos) from which to choose.

The method and/or system for dynamic user profile photo selection in some embodiments may use user-defined geotagged rules in the user preference settings. Examples of rules include, but are not limited to:

Rule 1: If a location L is deemed to be crowded, use photo 3 of 7.

Rule 2: If a location L is deemed to be privacy sensitive, generate avatar to replace my real photo.

Rule 3: If a viewer context is determined/detected to be "Happy", select photos that are tagged with "happy."

In some embodiments, the rules can be learned based on historical information. For instance, a rule engine may use various geolocation-dependent analytic services. Such services may include a crowd density analytic that may use nearby beacons, WiFi (wireless networking), connected devices, and/or others; social-networking analysis that learns about privacy associated risks to the user to a given location; deep-learning services to generate avatar by transforming the real photo of the user for privacy protection.

In some embodiments, the rules may be learned based on historical location-dependent context information, users, viewing or browsing history, social medial history. New rules, for example, which are learned automatically or autonomously, may be presented to the user on a graphical user interface (GUI) and/or added to the preference settings once approved by the user.

In some embodiments, the system and/or method may change or morph the profile picture based on a particular geotagging, location context, e.g., to express or show sympathy or condolences. Such context can be learned from analyzing social medial and crowdsourced data as well as triangulated with geolocation information.

In some embodiments, the profile photo may be upgraded or modified according to the viewer's feedback on the profile photo to achieve a suitable response from the viewer. Feedback, for example, may be attained from social media websites, for example, in forms of "likes" (an indication of approval for the post) and/or other indications, comments, sharing the photo with other people along with their description. Feedback, for example, may also be received from detecting the viewer's eye movements by eye tracking, gaze pattern analysis, the amount of time the viewer has a photo displayed, biometric feedback from facial expressions, and/or others. Automated feedback of this kind may be gained in a privacy preserving manner such as when a user (e.g., viewer) opts-in, for instance, with permission or authorization from the user.

The system and/or method of the present disclosure in some embodiments may automatically interpret the viewer's response and modify an existing image or select a new image (e.g., fetch from cloud or user's linked devices or another). An image may also be modified based on the priorities and preferences set by the user, so as to display a new profile photo to attain a set objective, e.g., for the next time the same viewer visits the user's web page or the like that displays the user's photo.

For example, a user in their profile may store multiple photos showing the user in different settings. For instance, a first photo of the user with another user, a second photo of the user which shows the user wearing university garb, a third photo of the user in a business setting, a fourth photo of the user in more casual setting, a fifth photo of the user which displays the user is speaking with a microphone at a podium in front of an audience. There may be different photos with different facial expressions. There may be different photos with different posture and clothing. The system and/or method of the present disclosure in some embodiments may select one of the photos stored in the user's profile for display based on an analysis of context and the viewer viewing the photo.

In some embodiments, the system and/or method of the present disclosure may select automatically different qualities of images based on context, for example, in case of an intermittent network connection. In some embodiments, an image quality subsystem may compute quality scores for images that represent a measure of visual quality of the images. Quality may refer to resolution, sharpness, and other aspects.

In some embodiments, the system may trigger a nearby user device for a new photo by transmitting information such as context, a rule, and/or another criterion. A user device may be recognized as being nearby, for example, if the system is able to communicate with the user device, for example, via short range communication techniques such as Bluetooth, or for example, via a local area network (LAN) or wide area network (WAN), or another. In another aspect, the user device that is triggered may need not be within a short range of communications, for example, so long as the system is able to communicate with the user device, for example, via a wireless network (WiFi) or another network. Examples of a user device may include, but are not limited to, a smartphone, a mobile phone, a tablet, and/or others. Responsive to receiving the trigger, the user device may select a suitable photo from a photo gallery (e.g., photos stored on the user's device memory, or photos stored elsewhere accessible by the user device, e.g., via WiFi), establish communications (e.g., Bluetooth) and then securely transmit the selected photo to change the user profile.

In some embodiments, the automated system and/or method of user profile photo selection may be triggered based on a user command such as a voice command. For instance, a viewer may voice a command that indicates the viewer's current need-based profile picture selection. As an example, a viewer may have a plan to attend a party and would like to see photos with a certain hairstyle, for example, curly hairstyle that a friend or coworker used before. The system and/or method of the present disclosure may then dynamically select photos that match curly hairstyles and present to the viewer.

The system and/or method of the present disclosure may also optionally implement a psycholinguistics analytic module to generate psycholinguistics personality profile of a viewer to find and/or suggest the types of profile picture. The psycholinguistics personality profile of the viewer may be built also in conjunction with an analysis of the "owner" of the profile page. The analytics module may gather recent past social network contributions of viewer (for example, including what he posts and/or replies) and then based on psycholinguistics analysis, the system and/or method of the present disclosure may identify recent personality profile of the user. An example of a determined personality profile of a viewer may be that the viewer is "adventurous."

Tools such as the IBM® Watson Personality Insights service, which uses IBM® Bluemix services may be employed to determine a personality profile. For instance, the IBM® Watson Personality Insights service uses linguistic analytics to infer the personality traits, intrinsic needs, and values of individuals from communications that the user makes available via mediums such as email, text messages, blog messages, forum posts, and/or others. The tool includes visualizing the analysis with types of information displayed in color-coded sections, and additionally with percentage indications for each characteristic in a personality profile. By way of another implementation, visual analytics techniques (e.g., deep-neural network) can be used to infer the personality traits of the user by analyzing facial expression, eye movement, gaze pattern, and/or others.

In some embodiments, traits or characteristics above a threshold percentage may be used in obtaining a profile picture. In some embodiments, color and clothing style preferences may be considered, for example, including the color and clothing style preferences of a user accessing a Web site. Varying degree of photorealism may be utilized, for example, from an actual photo of a person to modified images.

A user profile photo may apply to a team, for example, more than one person in a photo. The system and/or method in such scenarios may search for a photo in which all or part of a group is shown with the desired traits or profile. In some embodiments, the system may use custom trained machine learning models (e.g., trained deep-learning models using historical data) to compose a group photo by combining individual's photos, wherein the individual photos may be retrieved from user's contact directory, their websites, social medial pages, and/or others.

The system and/or method of the present disclosure may be used by an artificial intelligent (AI) agent. For example, an automated robot with a presence on the Web with a profile photo may desire to change the profile photo based on various analyses, for example, analyzing viewer of the photo, characteristics of available user photos, and geo-location context.

FIG. 1 is a block diagram illustrating components of a system of selecting and displaying photos in one embodiment. An analytics module 102, photo manipulation module 104, photo and profile selector 106 and display manager 108 components run or execute on one or more hardware processors, for example, coupled with one or more memory devices. The display manager 108 that manages the photo manager 136 and graphical user interfaces (GUI) 134, which may display photos, for example, on a web site page, and/or a mobile device, for example, on a display screen of a device.

The analytics module 102 may include functionalities that perform context analytics 110, social media analytics 112, personality analytics 114 and psycholinguistics analytics 116.

Context analyzer 110 may determine context about a user, a location, and photos. For example, cultural norm of a user and a viewer at a given location L, interest of a viewer, environment context of the user and a viewer and other context information. The context analyzer 110 may determine the time and place a viewer is triggering a displaying or opening of a user's photo, e.g., a web page or an application page that displays the user's photo. The context analyzer 110 may use historical geolocation data and crowd-sourced data to understand and characterize the cultural norm at a given location L. The context analyzer may use the personality analyzer 114, social media analyzer 112, and/or psycholinguistics analyzer to further understand interests of a viewer at a given time and location, context of a user (e.g., expression, sympathy, condolences) and so on.

Social media analyzer 112 may extract relevant information from social media applications to dynamically select and configure photos for a viewer. For example, viewer and user profiles, viewer and/or user activities on social media web pages, for example, web pages the viewer and/or users view, the comments the viewer and/or user posts, and/or other activities on social media web sites. Various existing algorithms such as predictive analytics, statistical and machine learning algorithms maybe used to train these algorithms using extracted social media data and recognize the patterns of a language or an image that a post is about cultural norms at a given location and time.

Personality analyzer 114 determines viewer and/or user personality, for example, based on information from the context analytics, social media analytics, psycholinguistics analytics, analysis of historical data related to a viewer engagement and interaction over a period of time, for a facial analysis, eye movement, gaze pattern analysis, and/or others. The method of personality analysis may receive and analyze viewer feedback by executing a custom trained machine learning model such as a neural network model.

Psycholinguistics analyzer 116 determines psycholinguistics personality profile of a viewer, for example, as described above, for example, employing tools such as the IBM® Watson Personality Insights service that infers personality traits. Psycholinguistics analyzer 116 may input information extracted by the social media analytics 112 to such a tool to generate personality traits.

Photo manipulation module 104 may manipulate photos and may include functionalities such as a rule engine 118, morphing engine 120, profile matcher 122 and photo receiver 124. The rule engine 118 may determine one or more rules which encode the specifications of what profile/photos should be selected, whether the profile and/or a photo should be modified, or an avatar or a drawing should be generated to display in place of displaying the photo. One or more rules may be fetched from a set of predetermined rules (e.g., user specified rules) and/or generated by applying one or more rule generation algorithms that may use one or more machine learning algorithms to learn from historical data.

For example, a rule-based machine learning method (e.g., association rule learning) maybe employed to discover interesting relations between previous rules in rule database, features in geolocation/demographic database, features in a viewer profile, features in a user profile photo store.

The photo receiver 124 may receive a photograph, e.g., an image file, from a photo or profile component 106 or from a nearby user device. The morphing engine 120 may modify the photograph, e.g., change the pixel values of the image file, change the color or brightness of the image, transform (e.g., blur or hide) part of the image that may contain sensitive or inappropriate information, based on a rule generated by the rule engine 118 or inputs from at least on analytics module 102.

The profile matcher 122 receives profile and/or photo from the photo receiver 124 and is responsible for matching the profile and/or photo with respect to the requirements or factors received from the profile and/or photo configuration engine 126. The profile matcher 122 may interact with the analytics module 102 to further refine and optimize photos which initially have passed the matching requirements or factors. In one embodiment, the profile matcher may trigger the morphing engine 120 depending on the analysis of the matching results (e.g., if the quality of matched photos is deemed to be below a specified threshold, the morphing engine maybe triggered).

Figure 2:
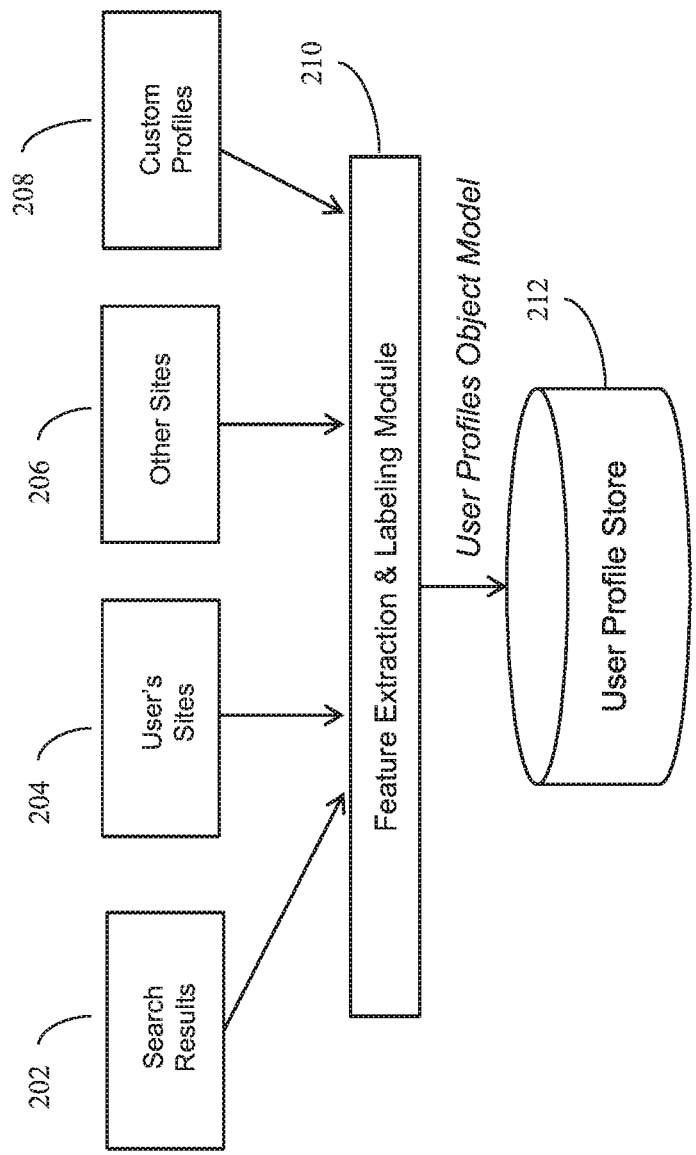
FIG. 2 is a diagram illustrating a user profile store in one embodiment.

The profile selector component 106 may select or retrieve a photo from a user profile store or database, for example, shown in FIGS. 2 and 212, for example, based on the rule engine's rule, and send the selected photo to the photo manipulation module 104. The profile selector component 106 may also receive a modified photo (if any) and display the modified photo or the photo via a display manager 108 to a display device or like interface such as a graphical user interface (GUI) 134, for example, of a web page, a mobile device or the like.

The profile selector component 106 may include a profile configuring engine 126, an S&P controller 128, a view monitoring component 130, and the display controller 132. The profile configuring engine 126 configures a profile and/or photo by interacting with the photo manipulation module 104, context analyzer 110, and/or based on analysis of data received from the view monitoring 130. The process of configuring a profile may include receiving requirements or factors to generate a profile for the first time, interpreting a viewer feedback to modify a profile photo(s), communicating with the photo manipulation module 104 to fetch a profile or photo.

The S&P controller 128 controls the Security and Privacy (S&P) aspects of a user photo (and the user) and/or a viewer by interacting with the analytics module 102 for inputs such as determined context, geolocation information, demographics characteristics to determine the security and privacy requirements, which are communicated with the display controller 132.

The view monitoring component 130 may collect stream of data about a viewer such as interaction and engagement (e.g., clickstream, time spent, and/or others) of a viewer with each displayed photo through a non-intrusive instrumentation and monitoring methods, e.g., Google® Analytics tools. In one aspect, such monitoring is performed with permission of the viewer or another being monitored.

The display controller 132 manages models and logics needed for the display manager 108 at runtime. The display manager may include preconfigured models and logics (e.g., S&P requirements).

The display manager 136 controls the photo manager 136 using the models and logics supplied by the display controller 132. For example, the display manager 136 may determine, at runtime, how the profile and/or photo(s) should be displayed on the Graphical User Interface (GUI) 134 according to at least one runtime condition such as device size and network connection. The components of shown in FIG. 2 may be implemented based on client-server architecture, for example, in which the client side instruments, collects and transmits data to the backend system as well as displays the photo on GUI. The backend system may be implemented on a Cloud computing environment and/or a proprietary system, or another computing system. The backend system may execute the various embodiments described herein. In some embodiment, one or more processing capabilities may reside on the client side, e.g., based on the availability of computation resources such as central processing unit, storage, and/or other resources. In one aspect, the GUI 134 may reside on client side.

FIG. 2 is a diagram illustrating a user profile store, for example, repository of photos (e.g., from a user's social media site, photo gallery store, e.g., on a mobile phone, and/or another storage) in one embodiment. A user profile photo may be retrieved from various data stores and web sites, for example, by performing a people search on the Internet or the World Wide Web as shown at 202, searching the user's own site 204, such as the owner's own web site or web page, for example, on a social media application or platform, other web sites 206 and/or custom profiles 208. Each profile photo and data retrieved or received from the various data sources may be analyzed using Feature Extraction & Labeling Module 210 so as to extract one or more characteristics of a profile and/or photo and one or more features of a profile and/or photo. One or more characteristics of a profile and/or photo may include date and location of the photo taken, description of the photo, context of the photo such as taken during an event as such a party. One or more features of a profile and/or photo may include one or more derived values of the photo (e.g., the sentiment of the user, cognitive state of the user such as happy, stress, confused, emotional level, and/or others) of the photo. One or more derived values of the photo may be extracted from the profile and/or photo by applying one or more of a plurality of custom machine learning algorithms or models such as edge detection, histogram computation, deep learning algorithms, sparse coding methods, and/or others. For example, the Feature Extraction & Labeling Module 210 may use a statistical association rule mining algorithm to select the most relevant profile image features. In further embodiment, the extracted characteristics, features and other metadata information in relation to the photo may be securely (e.g., using encryption technique) stored in a user profile store 212, along with the photos, which are also tagged to facilitate dynamic searching and indexing. The user profile store 212 may be hosted on a Cloud or dedicated (on-premise) storage device or environment. The user profile store 212 may include data stored as a database system, and stored on a storage device.

The system and/or method of the present disclosure may be used by one or more of cross-vendor social media website or services or artificial intelligent (AI) agents.

Figure 3:
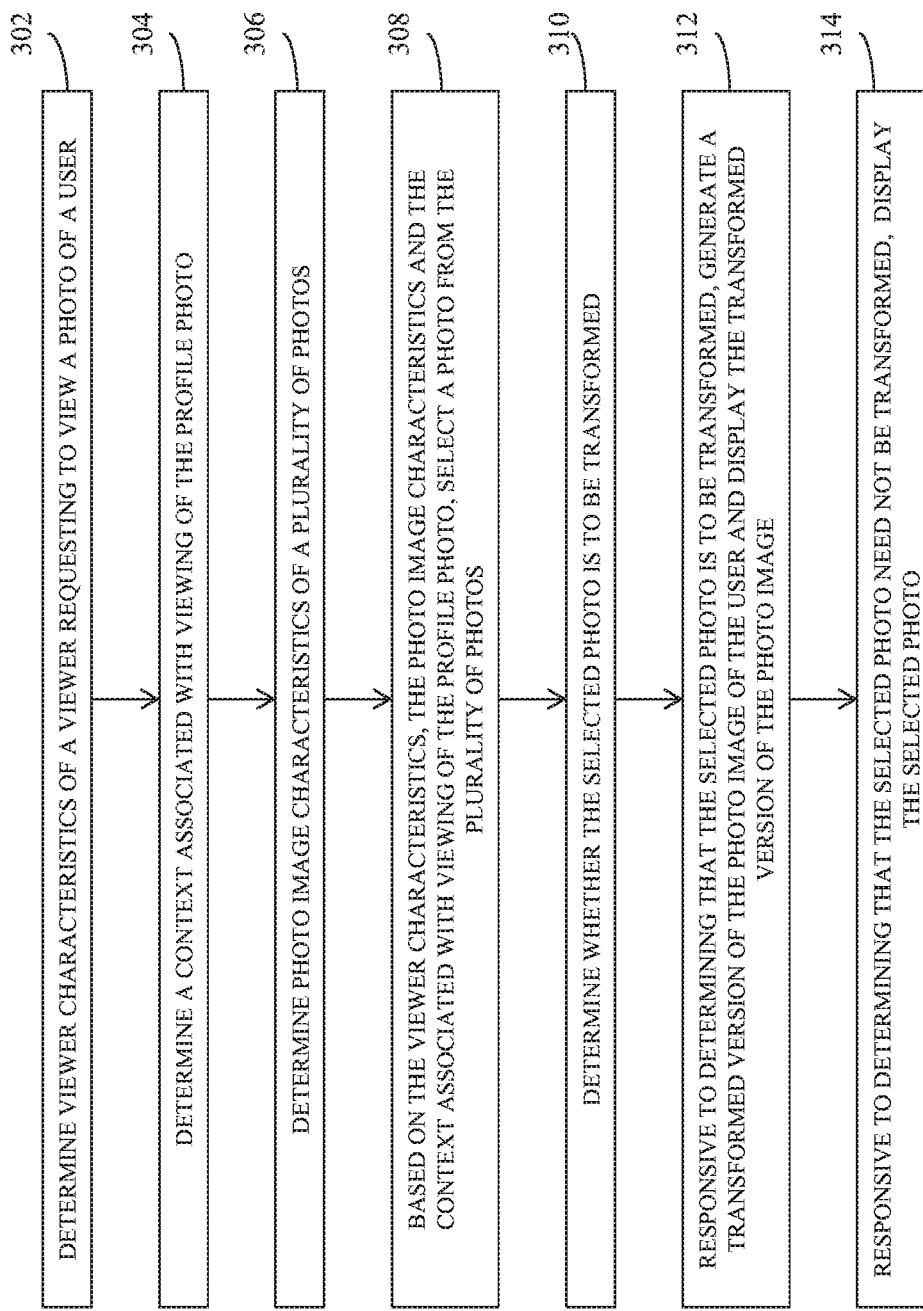
FIG. 3 is a flow diagram illustrating a method of automatically selecting and displaying a photo in one embodiment.

FIG. 3 is a flow diagram illustrating a method of automatically selecting and displaying a photo in one embodiment. The method may be executed by one or more hardware processors, for example, communicatively coupled to a communications network, and operatively coupled to at least on storage device. At 302, viewer characteristics of a viewer who is trying to view a profile photo of a user are determined. For instance, the viewer may be triggering an action to display or open an image file that includes a photo image of the user, for example, requesting of opening the file by visiting a web site or web page that displays a photo, or another action that would display the image file. The viewer characteristics may be determined by analyzing data, for example, social media application data and/or other data. A user may include a group of users, for example, a team. In another aspect, a user may include a user's organization, software agent. In those examples, a photo of a user may include a photo of a team at work, family members, company, a store, and/or a graphic or icon that represents a bot. As another example, the photo that is being requested for display for a viewer to view may include a building or another object.

Examples of viewer characteristics may include an estimation of the viewer demographic, a service provider of the user, interests of the user, geographic location of the user, the number of page views for individual pages of the user, duration of time people spend on specific pages of the user, the web sites people were visiting before they visited the site that displays the profile photo, the time people visited the site that displays the profile photo and how long they stay on the site, from what countries the visitors to the site are, for example, to determine liberalness of dress code, what computing device (e.g., a smartphone, tablet, standard computer, and/or another device), browsers and operating systems the visitors to the web site are using. The method of photo selection process may receive the requirements or factors for selecting a photo(s) and apply the selection algorithm to retrieve from user profile store 212 the best matching profile and/or photos according to the received requirements or factors. If a matching profile and/or photo is not found or the confidence level of the selected photo is below a defined threshold, the selection algorithm may trigger one or more other techniques such as triggering a nearby or remote user device for a new photo by sending the selection factors, and/or triggering a morphing engine, and/or another action.

At 304, a context associated with viewing of the profile photo may be determined. Such context may be determined by analyzing social media data and/or from crowdsourced data. The context may include cultural norm context and environmental context, for example, time and place a viewer is opening the profile photo, for example, in a public place, culturally sensitive place, time of day, day of week, holiday, and/or others.

At 306, photo image characteristics of a plurality of photos stored on at least one storage device may be determined. For instance, image analysis may be performed on the plurality of photos to identify different characteristics of the photos. The photo characteristics may include various attributes of the photo such as: facial expression, microexpression (e.g., mood analysis), cropping/magnification, size, clothing, color themes, fashion styles of individuals appearing in the photos, lighting, position, posture, viewpoint, background image, attractiveness estimation based on crowdsourcing (e.g., voting), number of individuals appearing in the photos, the degree or extent of photorealism (e.g., a real photo, an avatar, a drawing), an animation.

The plurality of photos from which to choose may be received via a communications network from one or more of a mobile device, a server device, and a web server device. In another aspect, the plurality of photos may have been pre-loaded by the user, and made accessible by the hardware processor executing the method.

At 308, based on the viewer characteristics, the photo image characteristics, the photo image features and the context associated with viewing of the profile photo, a photo is selected from the plurality of photos stored in the user profile store 212. In some embodiments, a photo may be selected further based on one or more rules specifying one or more conditions in selecting the photo.

At 310, it is determined whether the selected photo is to be transformed. For example, based on the context such as requirement for privacy, it may be determined that the selected photo should be transformed before being displayed. For instance, it may be determined that the photo should be transformed the viewer's previous responses to photos the viewer has viewed, and/or based on analysis of the viewer profile, and/or others. The user may also have specified to not display the selected photo as is. In another aspect, the method may learn, e.g., using a machine learning algorithm and training at least one custom trained machine learning model, the context, user feedback, risk, and other factors from historical data and other plurality of data sources (e.g., crowdsourcing) such that at least one transformation algorithm may be executed to dynamically adapt avatar that complies with requirements, for example, with privacy and security requirements and viewer concern level.

At 312, responsive to determining that the selected photo is to be transformed, a transformed version of the photo image of the user is generated and the transformed version of the photo image of the user is displayed on a display device associated with the viewer via a user interface. For example, an image of an avatar corresponding to the user may be generated to be displayed in lieu of the actual user's photo. As another example, an image of the user with a selected degree of photorealism may be generated. The degree of photorealism that is selected may be based on the accuracy level of the at least one custom trained machine learning model for photo morphing, a threshold value set for the number of iteration to be done, user feedback, and/or other factors. Techniques such as deep-learning services may be employed to generate an avatar image by transforming the real photo of the user, for example, for privacy protection. In another aspect, the user's photo may be changed or morphed based on the context, e.g., to express sympathy or condolences.

At 314, responsive to determining that the selected photo need not be transformed, the selected photo is displayed on the display device via the user interface.

A profile photo of a user may be displayed, for example, at social media web pages such as the web pages of existing social media applications, a company phone book, a resume page, and/or others.

In some embodiments, one or more rules may be automatically determined for specifying one or more conditions in selecting the photo, for example, what photos should be selected, whether the profile and/or a photo should be modified, or an avatar or a drawing should be generated to display in place of displaying the photo. One or more rules may be fetched from a set of predetermined rules (e.g., user specified rules) and/or generated by applying one or more rule generation algorithms that may use machine learning algorithms (e.g., a genetic algorithm, association rule learning) to automatically learn from historical data available from one or more data sources. For example, a rule-based machine learning method maybe employed to discover interesting relations (e.g., photo matching) between historical rules in a rule database, features in geolocation/demographic database, features in a viewer profile, and/or features in a user profile photo store. One or more rules may be based on historical data, one or more of the social media application data, determined context, and/or other data. Rules may be learned from historical information, crowd density information determined using crowd density analytics performed using nearby beacons, WiFi, and/or other connected devices; and/or information from social-networking analysis to learn about privacy associated risk to the user to a given location.

In another aspect, a photo may be selected further based on user-defined geotagged rules that can be configured on user preference settings such as firewall rules. An example of a rule may specify, "If a location L is deemed to be crowded, use photo 3 of 7"; another example rule may specify, "If a location L is deemed to be privacy sensitive, generate an avatar to replace my real photo."

The method may also include triggering a nearby or remote user device such as a mobile phone, a tablet, a laptop, or another device, for new photo by transmitting information such as the context and/or a rule. The method of triggering a nearby or remote user devices may be determined based on at least one requirement received from a photo selection algorithm, which may reside on the client side or server side of the disclosed system. An application running on the remote user device may receive the information and based on the information select a suitable photo from a photo gallery, establish a communication (e.g., Bluetooth) if not already established, and then securely transmit the selected photo to change the user profile.

The method may also include detecting or monitoring, aggregating and analyzing viewer's feedback on the profile photo. In one aspect, feedback may be attained from social media websites in the form of "Likes", comments entered by the viewer, sharing the photo with other people along with their description, a voice command, implicit feedback, and/or others. Based on the feedback, the profile photo may be dynamically upgraded, for example, to a new photo, morphed or replaced into a different image. The viewer's feedback, for example, of the photo or a modified photo, may be used to establish a confidence level of the new photo. For instance, in some embodiments, the confidence level is established based on the viewer's feedback. Positive and negative comments and reactions to different photos (including the one selected to be displayed) may be fed back as inputs to a neural networks machine learning algorithm in order to learn the optimal photo selection. For instance, initially, the photo displayed may be considered to be not appropriate (relatively) based on only the input features like viewer's profile, social media portal information and other factors. The real-time feedback implies analysis of real-time comments or reactions (such as "likes") to the photo which can modify the output at any given time. Hence, this leads to selecting an alternate photo or filtering or blurring (hiding) the contents of the photo based on that active feedback which is inherently modifying the confidence level (or rigidity factor as alternate term to be used) of the machine learning algorithm. The information on the viewer is obtained with the permission of the viewer, for instance, in an opt-in fashion.

The viewer's response to a modified profile photo may be interpreted automatically by the system in order to modify an existing photo or select a new photo. The method of interpreting a viewer feedback may receive a viewer response to a modified profile photo. A viewer response may be an explicit response (e.g., a text or audio command or feedback), implicit response, or a combination of both. Examples of explicit response include a viewer confusion, dislike or satisfaction level, which may be dynamically detected from viewer monitoring patterns, analysis of facial expression, eye movement, voice tone, and/or others. In another aspect, an existing photo may be modified based on predefined priorities and preferences set by the user. In some embodiments, based on the result(s) of interpretation of a viewer response, the method may include selecting a new photo, applying at least one custom trained machine learning model to modify an existing photo, for example, morphing an existing photo.

Figure 4:
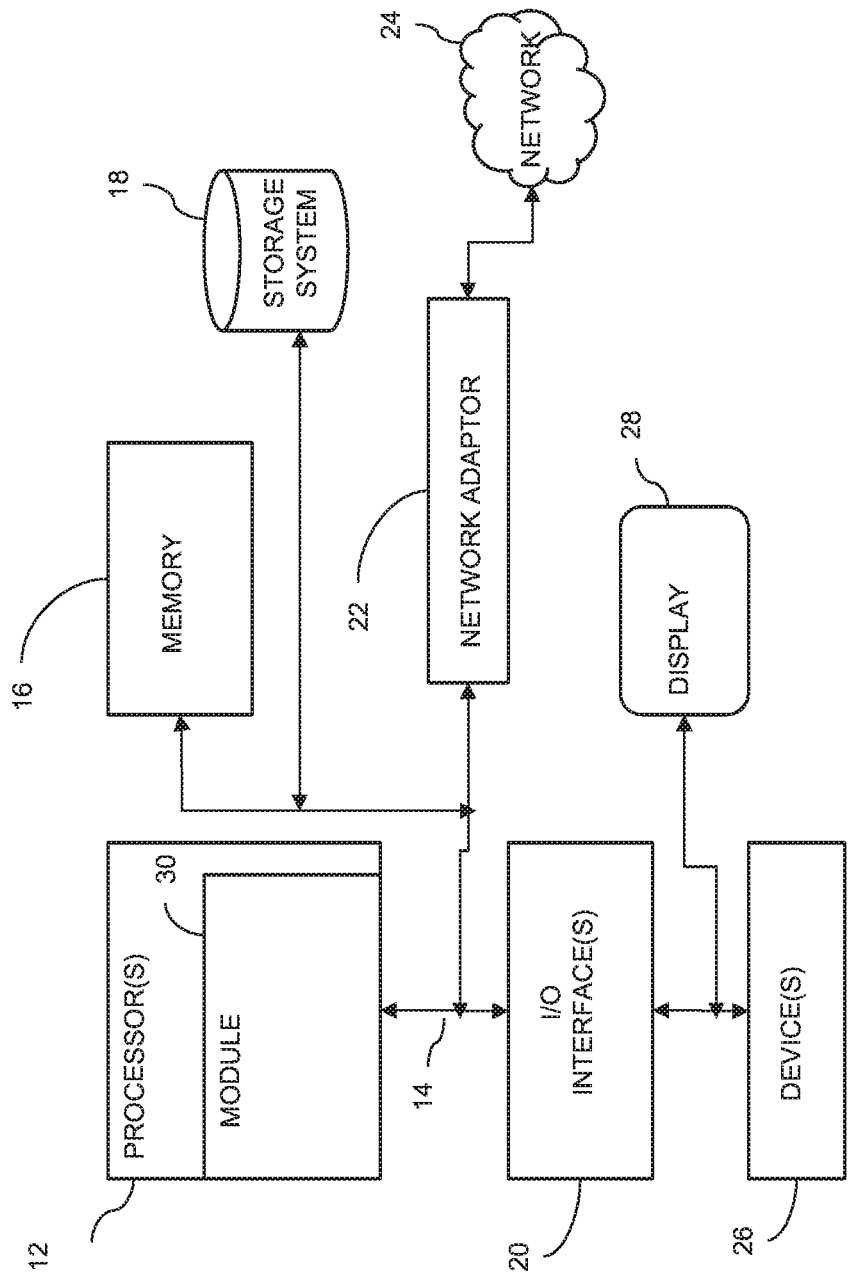
FIG. 4 illustrates a schematic of an example computer or processing system that may implement a system in one embodiment of the present disclosure.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others.

Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of selecting and displaying a profile photo, the method performed by at least one hardware processor, the method comprising:
    determining viewer characteristics of a viewer who is triggering an action to open an image file comprising a photo image of a user to view a profile photo of the user, the determining performed based on analyzing at least social media application data, the viewer characteristics including at least a geolocation of the viewer triggering the action to open the image file;
    determining a context associated with viewing of the profile photo;
    determining photo image characteristics of a plurality of photos stored on at least one storage device;
    based on the viewer characteristics, the photo image characteristics and the context associated with viewing of the profile photo, selecting a photo from the plurality of photos;
    determining whether the selected photo is to be transformed;
    responsive to determining that the selected photo is to be transformed, generating a transformed version of the photo image of the user and displaying the transformed version of the photo image of the user on a display device associated with the viewer via a user interface; and
    responsive to determining that the selected photo need not be transformed, causing displaying of the selected photo on the display device via the user interface.

2. The method of claim 1, further comprising automatically generating one or more rules specifying one or more conditions in selecting the photo based on one or more of the social media application data and the context.

3. The method of claim 1, wherein the selecting a photo from the plurality of photos is performed further based on one or more rules specifying one or more conditions in selecting the photo.

4. The method of claim 1, wherein the generating the transformed version of the photo image comprises generating an image of an avatar corresponding to the user.

5. The method of claim 1, wherein the generating the transformed version of the photo image comprises generating an image with a degree of photorealism corresponding to the user.

6. The method of claim 1, wherein the plurality of photos stored on at least one storage device is received via a communications network from one or more of a mobile device, a server device, and a web server device.

7. The method of claim 1, wherein the plurality of photos is pre-loaded by the user.

8. A computer program product comprising a computer readable storage medium having program instructions embodied therewith, the program instructions executable by a device to cause the device to:
    determine viewer characteristics of a viewer who is triggering an action to open an image file comprising a photo image of a user to view a profile photo of the user, the determining performed based on analyzing at least social media application data, the viewer characteristics including at least a geolocation of the viewer triggering the action to open the image file;
    determine a context associated with viewing of the profile photo;
    determine photo image characteristics of a plurality of photos stored on at least one storage device;
    based on the viewer characteristics, the photo image characteristics and the context associated with viewing of the profile photo, select a photo from the plurality of photos;
    determine whether the selected photo is to be transformed;
    responsive to determining that the selected photo is to be transformed, generate a transformed version of the photo image of the user and displaying the transformed version of the photo image of the user on a display device associated with the viewer via a user interface; and
    responsive to determining that the selected photo need not be transformed, cause to display the selected photo on the display device via the user interface.

9. The computer program product of claim 8, where in the device is further caused to automatically generate one or more rules specifying one or more conditions in selecting the photo based on one or more of the social media application data and the context.

10. The computer program product of claim 8, wherein the device is caused to select a photo from the plurality of photos further based on one or more rules specifying one or more conditions in selecting the photo.

11. The computer program product of claim 8, wherein the device is caused to generate the transformed version of the photo image by generating an image of an avatar corresponding to the user.

12. The computer program product of claim 8, wherein the device is caused to generate the transformed version of the photo image by generating an image with a degree of photorealism corresponding to the user.

13. The computer program product of claim 8, wherein the plurality of photos stored on at least one storage device is received via a communications network from one or more of a mobile device, a server device, and a web server device.

14. The computer program product of claim 8, wherein the plurality of photos is pre-loaded by the user.

15. A system of selecting and displaying a profile photo, comprising:
    a hardware processor coupled with a communications network; and
    at least one storage device coupled with the hardware processor;
    the hardware processor operable to perform:
        determining viewer characteristics of a viewer who is triggering an action to open an image file comprising a photo image of a user to view a profile photo of the user, the determining performed based on analyzing at least social media application data, the viewer characteristics including at least a geolocation of the viewer triggering the action to open the image file;
        determining a context associated with viewing of the profile photo;
        determining photo image characteristics of a plurality of photos stored on the at least one storage device;
        based on the viewer characteristics, the photo image characteristics and the context associated with viewing of the profile photo, selecting a photo from the plurality of photos;
        determining whether the selected photo is to be transformed;
        responsive to determining that the selected photo is to be transformed, generating a transformed version of the photo image of the user and triggering a displaying of the transformed version of the photo image of the user on a display device associated with the viewer via a user interface; and
        responsive to determining that the selected photo need not be transformed, triggering a displaying of the selected photo on the display device via the user interface.

16. The system of claim 15, where in the hardware processor further automatically generates one or more rules specifying one or more conditions in selecting the photo based on one or more of the social media application data and the context.

17. The system of claim 15, wherein the hardware processor selects a photo from the plurality of photos further based on one or more rules specifying one or more conditions in selecting the photo.

18. The system of claim 15, wherein the hardware processor generating the transformed version of the photo image comprises the hardware processor generating an image of an avatar corresponding to the user.

19. The system of claim 15, wherein the hardware processor generating the transformed version of the photo image comprises the hardware processor generating an image with a degree of photorealism corresponding to the user.

20. The system of claim 15, wherein the plurality of photos stored on at least one storage device is received via the communications network from one or more of a mobile device, a server device, and a web server device.

\* \* \* \* \*